United States Patent
Biswas et al.

(10) Patent No.: US 11,574,278 B1
(45) Date of Patent: *Feb. 7, 2023

(54) SYSTEMS AND METHODS PROVIDING KNOWN SHIPPER INFORMATION FOR SHIPPING INDICIA

(71) Applicant: Stamps.com Inc., El Segundo, CA (US)

(72) Inventors: Michael J. Biswas, Los Angeles, CA (US); J P Leon, Marina del Ray, CA (US)

(73) Assignee: Auctane, Inc., Austin, TX (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/156,382

(22) Filed: Jan. 22, 2021

Related U.S. Application Data (63) Continuation of application No. 13/357,311, filed on Jan. 24, 2012, now Pat. No. 10,922,641.

(51) Int. Cl.
   *G06Q 10/08* (2012.01)
(52) U.S. Cl.
   CPC ....... *G06Q 10/083* (2013.01); *G06Q 10/0833* (2013.01)
(58) Field of Classification Search
   CPC .................. G06Q 10/083; G06Q 10/0833
   (Continued)

(56) References Cited

U.S. PATENT DOCUMENTS 1,684,756 A  9/1928 Close
1,988,908 A  1/1935 MacKinnon
(Continued)

FOREIGN PATENT DOCUMENTS

DE   4409386 A1   9/1995
EP   0137737 A2   4/1985
(Continued)

OTHER PUBLICATIONS

High tech stamps that link to app. Sep. 3, 2010. The Herald, https://dialog.proquest.com/professional/docview/749282854?accountid=161862. (Year: 2010).*

(Continued)

*Primary Examiner* — Jeff Zimmerman
*Assistant Examiner* — Hunter A Molnar
(74) *Attorney, Agent, or Firm* — Norton Rose Fulbright US LLP (57) ABSTRACT

Systems and methods which provide known shipper information in association with unknown shipper indicia as disclosed. Embodiments operate to collect information regarding a shipper and associate the shipper information with unknown shipper indicia. Where shipper information satisfactory to a known shipper requirement has not otherwise been collected, embodiments operate to perform a transaction matrix analysis to determine a shipper identification risk level. Such transaction matrix analysis may operate to analyze multiple pieces of shipper information (e.g., collected from different sources) to provide a determination as to a level of risk that the shipper information correctly and/or uniquely identifies the shipper. A shipping service provider, when accepting an item for shipment and/or when processing the item during shipment, may use the unknown shipper indicia to access shipper information associated therewith in accordance to embodiments of the invention to provide an appropriate level of shipping services.

20 Claims, 2 Drawing Sheets

(58) Field of Classification Search
USPC ........................................................ 705/334
See application file for complete search history.

(56) References Cited

U.S. PATENT DOCUMENTS

| | | |
|---|---|---|
| 2,825,498 A | 3/1958 | Alves |
| 2,887,326 A | 5/1959 | Kramer |
| 2,964,232 A | 12/1960 | Levyn |
| 3,111,084 A | 11/1963 | Ridenour et al. |
| 3,221,980 A | 12/1965 | Mercur |
| 3,380,648 A | 4/1968 | De Lyra |
| 3,584,696 A | 6/1971 | Eblowitz |
| 3,594,727 A | 7/1971 | Braun |
| 3,658,239 A | 4/1972 | Foutz |
| 3,691,726 A | 9/1972 | Stephens et al. |
| 3,747,837 A | 7/1973 | Wilson |
| 3,938,095 A | 2/1976 | Check, Jr. et al. |
| 3,978,457 A | 8/1976 | Check, Jr. et al. |
| 4,119,194 A | 10/1978 | Freeman et al. |
| 4,201,339 A | 5/1980 | Gunn |
| 4,245,775 A | 1/1981 | Conn |
| 4,253,158 A | 2/1981 | McFiggans |
| 4,271,481 A | 6/1981 | Check, Jr. et al. |
| 4,306,299 A | 12/1981 | Check, Jr. et al. |
| 4,376,299 A | 3/1983 | Rivest |
| 4,511,793 A | 4/1985 | Racanelli |
| 4,565,317 A | 1/1986 | Kranz |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,709,850 A | 12/1987 | Wagner |
| 4,725,718 A | 2/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,784,317 A | 11/1988 | Chen et al. |
| 4,800,506 A | 1/1989 | Axelrod et al. |
| 4,802,218 A | 1/1989 | Wright et al. |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod et al. |
| 4,864,618 A | 9/1989 | Wright et al. |
| 4,868,757 A | 9/1989 | Gil |
| 4,872,705 A | 10/1989 | Hartfeil |
| 4,872,706 A | 10/1989 | Brewen et al. |
| 4,873,645 A | 10/1989 | Hunter et al. |
| 4,875,174 A | 10/1989 | Olodort et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Chang et al. |
| 4,919,325 A | 4/1990 | Culver |
| 4,933,849 A | 6/1990 | Connell et al. |
| 4,934,846 A | 6/1990 | Gilham |
| 4,941,091 A | 7/1990 | Breault et al. |
| 4,947,333 A | 8/1990 | Sansone et al. |
| 4,993,752 A | 2/1991 | Juszak |
| 4,998,204 A | 3/1991 | Sansone et al. |
| 5,025,141 A | 6/1991 | Bolan |
| 5,044,669 A | 9/1991 | Berry |
| 5,058,008 A | 10/1991 | Schumacher |
| 5,065,000 A | 11/1991 | Pusic |
| 5,067,088 A | 11/1991 | Schneiderhan |
| 5,075,862 A | 12/1991 | Doeberl et al. |
| 5,077,792 A | 12/1991 | Herring |
| 5,085,470 A | 2/1992 | Peach et al. |
| 5,091,771 A | 2/1992 | Bolan et al. |
| 5,111,030 A | 5/1992 | Brasington et al. |
| 5,119,306 A | 6/1992 | Metelits et al. |
| 5,136,647 A | 8/1992 | Haber et al. |
| 5,150,407 A | 9/1992 | Chan |
| 5,200,903 A | 4/1993 | Gilham et al. |
| 5,202,834 A | 4/1993 | Gilham |
| 5,233,657 A | 8/1993 | Gunther |
| 5,237,506 A | 8/1993 | Horbal et al. |
| 5,239,168 A | 8/1993 | Dursty, Jr. et al. |
| 5,289,540 A | 2/1994 | Jones |
| 5,316,208 A | 5/1994 | Petkovsek |
| 5,319,562 A | 6/1994 | Whitehouse |
| 5,323,323 A | 6/1994 | Gilham |
| 5,323,465 A | 6/1994 | Avarne |
| 5,341,505 A | 8/1994 | Whitehouse |
| 5,360,628 A | 11/1994 | Butland |
| 5,375,172 A | 12/1994 | Chrosny |
| 5,384,886 A | 1/1995 | Rourke |
| 5,388,049 A | 2/1995 | Sansone et al. |
| 5,390,849 A | 2/1995 | Frissard |
| 5,410,642 A | 4/1995 | Hakamatsuka et al. |
| 5,423,573 A | 6/1995 | de Passille |
| 5,425,586 A | 6/1995 | Berson |
| 5,437,441 A | 8/1995 | Tuhro et al. |
| 5,439,721 A | 8/1995 | Pedroli et al. |
| 5,449,200 A | 9/1995 | Andric et al. |
| 5,454,038 A | 9/1995 | Cordery et al. |
| 5,471,925 A | 12/1995 | Heinrich et al. |
| 5,476,420 A | 12/1995 | Manning |
| 5,490,077 A | 2/1996 | Freytag |
| 5,494,445 A | 2/1996 | Sekiguchi et al. |
| 5,501,393 A | 3/1996 | Walz |
| 5,502,304 A | 3/1996 | Berson et al. |
| 5,510,992 A | 4/1996 | Kara |
| 5,524,995 A | 6/1996 | Brookner et al. |
| 5,554,842 A | 9/1996 | Connell et al. |
| 5,569,317 A | 10/1996 | Sarada et al. |
| 5,573,277 A | 11/1996 | Petkovsek |
| 5,583,779 A | 12/1996 | Naclerio et al. |
| 5,598,970 A | 2/1997 | Mudry |
| 5,600,562 A | 2/1997 | Guenther |
| 5,601,313 A | 2/1997 | Konkol et al. |
| 5,602,743 A | 2/1997 | Fraytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,615,123 A | 3/1997 | Davidson et al. |
| 5,615,312 A | 3/1997 | Kohler |
| 5,617,519 A | 4/1997 | Herbert |
| 5,619,571 A | 4/1997 | Sandstrom et al. |
| 5,623,546 A | 4/1997 | Hardy et al. |
| 5,635,694 A | 6/1997 | Tuhro |
| 5,649,118 A | 7/1997 | Carlisle et al. |
| 5,650,934 A | 7/1997 | Manduley |
| 5,651,238 A | 7/1997 | Belec et al. |
| 5,655,023 A | 8/1997 | Cordery et al. |
| 5,666,215 A | 9/1997 | Fredlund et al. |
| 5,666,284 A | 9/1997 | Kara |
| 5,682,318 A | 10/1997 | Kara |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,717,980 A | 2/1998 | Oka et al. |
| 5,729,460 A | 3/1998 | Plett et al. |
| 5,737,729 A | 4/1998 | Denman |
| 5,742,683 A | 4/1998 | Lee et al. |
| 5,768,132 A | 6/1998 | Cordery et al. |
| 5,774,886 A | 6/1998 | Kara |
| 5,778,076 A | 7/1998 | Kara et al. |
| 5,791,553 A | 8/1998 | Fabel |
| 5,796,834 A | 8/1998 | Whitney et al. |

(56) References Cited

U.S. PATENT DOCUMENTS

| | | |
|---|---|---|
| 5,801,364 A | 9/1998 | Kara et al. |
| 5,801,944 A | 9/1998 | Kara |
| 5,805,810 A | 9/1998 | Maxwell |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,836,617 A | 11/1998 | Beaudoin et al. |
| 5,860,068 A | 1/1999 | Cook |
| 5,884,277 A | 3/1999 | Khosla |
| 5,902,439 A | 5/1999 | Pike et al. |
| 5,923,406 A | 7/1999 | Brasington et al. |
| 5,923,885 A | 7/1999 | Johnson et al. |
| 5,924,738 A | 7/1999 | Konkol et al. |
| 5,929,415 A | 7/1999 | Berson |
| 5,932,139 A | 8/1999 | Oshima et al. |
| 5,936,865 A | 8/1999 | Pintsov et al. |
| 5,936,885 A | 8/1999 | Morita et al. |
| 5,946,671 A | 8/1999 | Herring |
| 5,950,916 A | 9/1999 | Santangelo |
| 5,960,418 A | 9/1999 | Kelly et al. |
| 5,983,209 A | 11/1999 | Kara |
| 5,995,985 A | 11/1999 | Cai |
| 6,005,945 A | 12/1999 | Whitehouse |
| 6,010,069 A | 1/2000 | Debois |
| 6,010,156 A | 1/2000 | Slock |
| 6,026,385 A | 2/2000 | Harvey et al. |
| 6,033,751 A | 3/2000 | Kline |
| 6,061,670 A | 5/2000 | Brand |
| D434,438 S | 11/2000 | Kara |
| 6,142,380 A | 11/2000 | Sansone et al. |
| 6,155,476 A | 12/2000 | Fabel |
| 6,173,888 B1 | 1/2001 | Fabel |
| 6,175,826 B1 | 1/2001 | Malandra, Jr. et al. |
| 6,181,433 B1 | 1/2001 | Hayama et al. |
| 6,184,534 B1 | 2/2001 | Stephany et al. |
| 6,199,055 B1 | 3/2001 | Kara et al. |
| 6,208,980 B1 | 3/2001 | Kara |
| 6,209,779 B1 | 4/2001 | Fabel |
| 6,233,565 B1 | 5/2001 | Lewis et al. |
| 6,234,694 B1 | 5/2001 | Brookner |
| 6,244,763 B1 | 6/2001 | Miller |
| 6,249,777 B1 | 6/2001 | Kara et al. |
| 6,282,524 B1 | 8/2001 | Kramer |
| 6,296,404 B1 | 10/2001 | Pierce et al. |
| 6,311,240 B1 | 10/2001 | Boone et al. |
| 6,322,192 B1 | 11/2001 | Walker |
| 6,370,844 B1 | 4/2002 | Stricker |
| 6,385,504 B1 | 5/2002 | Pintsov et al. |
| 6,397,328 B1 | 5/2002 | Pitchenik et al. |
| 6,415,983 B1 | 7/2002 | Ulvr et al. |
| 6,427,021 B1 | 7/2002 | Fischer et al. |
| 6,428,219 B1 | 8/2002 | Stier et al. |
| 6,430,543 B1 | 8/2002 | Lee et al. |
| 6,438,530 B1 | 8/2002 | Heiden et al. |
| 6,461,063 B1 | 10/2002 | Miller et al. |
| 6,505,179 B1 | 1/2003 | Kara |
| 6,505,980 B1 | 1/2003 | Allday |
| 6,523,014 B1 | 2/2003 | Pauschinger |
| 6,526,391 B1 | 2/2003 | Cordery et al. |
| 6,532,452 B1 | 3/2003 | Pintsov et al. |
| 6,594,374 B1 | 7/2003 | Beckstrom et al. |
| 6,595,412 B2 | 7/2003 | Manduley |
| 6,655,579 B1 | 12/2003 | Delman et al. |
| 6,671,813 B2 | 12/2003 | Ananda |
| 6,692,031 B2 | 2/2004 | McGrew |
| 6,697,822 B1 | 2/2004 | Armatis et al. |
| 6,701,304 B2 | 3/2004 | Leon |
| 6,722,563 B1 | 4/2004 | Johnson et al. |
| 6,735,575 B1 | 5/2004 | Kara |
| 6,820,201 B1 | 11/2004 | Lincoln et al. |
| 6,834,112 B1 | 12/2004 | Brickell |
| 6,834,273 B1 | 12/2004 | Sansone et al. |
| 6,853,990 B1 | 2/2005 | Thiel |
| 6,868,406 B1 | 3/2005 | Ogg et al. |
| 6,902,265 B2 | 6/2005 | Critelli et al. |
| 6,904,168 B1 | 6/2005 | Steinberg et al. |
| 6,946,960 B2 | 9/2005 | Sisson et al. |
| 6,948,660 B2 | 9/2005 | Critelli et al. |
| 7,028,902 B2 | 4/2006 | Xu et al. |
| 7,039,214 B2 | 5/2006 | Miller et al. |
| 7,069,253 B2 | 6/2006 | Leon |
| 7,085,725 B1 | 8/2006 | Leon |
| 7,117,363 B2 | 10/2006 | Lincoln et al. |
| 7,127,434 B2 | 10/2006 | Burningham |
| 7,149,726 B1 | 12/2006 | Lingle et al. |
| 7,162,460 B2 | 1/2007 | Cleckler et al. |
| 7,182,259 B2 | 2/2007 | Lubow et al. |
| 7,191,158 B2 | 3/2007 | Ogg |
| 7,191,336 B2 | 3/2007 | Zeller et al. |
| 7,194,957 B1 | 3/2007 | Leon et al. |
| 7,201,305 B1 | 4/2007 | Correa |
| 7,222,236 B1 | 5/2007 | Pagel |
| 7,225,170 B1 | 5/2007 | Ryan, Jr. |
| 7,233,929 B1 | 6/2007 | Lingle et al. |
| 7,234,645 B2 | 6/2007 | Silverbrook et al. |
| 7,243,842 B1 | 7/2007 | Leon et al. |
| 7,266,531 B2 | 9/2007 | Pintsov et al. |
| 7,305,556 B2 | 12/2007 | Slick et al. |
| 7,337,152 B1 | 2/2008 | Gawler |
| 7,343,357 B1 | 3/2008 | Kara |
| 7,396,048 B2 | 7/2008 | Janetzke et al. |
| 7,418,599 B2 | 8/2008 | Peters |
| 7,458,612 B1 | 12/2008 | Bennett |
| 7,509,291 B2 | 3/2009 | McBride et al. |
| 7,548,612 B2 | 6/2009 | Weissman et al. |
| 7,577,618 B2 | 8/2009 | Raju et al. |
| 7,711,650 B1 | 5/2010 | Kara |
| 7,778,924 B1 | 8/2010 | Ananda |
| 7,784,090 B2 | 8/2010 | Lord et al. |
| 7,828,223 B1 | 11/2010 | Leon et al. |
| 7,831,518 B2 | 11/2010 | Montgomery et al. |
| 7,831,524 B2 | 11/2010 | Whitehouse |
| 7,831,824 B2 | 11/2010 | Abdulhayoglu |
| 7,840,492 B2 | 11/2010 | Leung et al. |
| 7,954,709 B1 | 6/2011 | Leon et al. |
| 7,963,437 B1 | 6/2011 | McBride et al. |
| 8,100,324 B1 | 1/2012 | Leon |
| 8,155,976 B1 | 4/2012 | Rendich et al. |
| 8,204,835 B1 | 6/2012 | Ogg |
| 8,240,579 B1 | 8/2012 | Bennett |
| 8,285,651 B1 | 10/2012 | Leon et al. |
| 8,612,361 B1 | 12/2013 | Bussell et al. |
| 8,626,673 B1 | 1/2014 | Bennett |
| 8,775,331 B1 | 7/2014 | Tsuie et al. |
| 9,208,620 B1 | 12/2015 | Bortnak et al. |
| 9,911,246 B1 | 3/2018 | McBride et al. |
| 9,978,185 B1 | 5/2018 | Bortnak et al. |
| 2001/0007086 A1 | 7/2001 | Rogers et al. |
| 2001/0020234 A1 | 9/2001 | Shah et al. |
| 2001/0022060 A1 | 9/2001 | Robertson et al. |
| 2001/0032881 A1 | 10/2001 | Wells et al. |
| 2001/0042052 A1 | 11/2001 | Leon |
| 2001/0054153 A1 | 12/2001 | Wheeler et al. |
| 2002/0023057 A1 | 2/2002 | Goodwin et al. |
| 2002/0032668 A1 | 3/2002 | Kohler et al. |
| 2002/0032784 A1 | 3/2002 | Darago et al. |
| 2002/0033598 A1 | 3/2002 | Beasley |
| 2002/0046195 A1 | 4/2002 | Martin et al. |
| 2002/0052841 A1 | 5/2002 | Guthrie et al. |
| 2002/0070149 A1 | 6/2002 | Schererz et al. |
| 2002/0073039 A1 | 6/2002 | Ogg et al. |
| 2002/0073050 A1 | 6/2002 | Gusler et al. |
| 2002/0082935 A1 | 6/2002 | Moore et al. |
| 2002/0083020 A1 | 6/2002 | Leon |
| 2002/0083021 A1 | 6/2002 | Ryan et al. |
| 2002/0099652 A1 | 7/2002 | Herzen et al. |
| 2002/0143431 A1 | 10/2002 | Sansone |
| 2002/0149195 A1 | 10/2002 | Beasley |
| 2002/0190117 A1 | 12/2002 | Manduley |
| 2003/0002709 A1 | 1/2003 | Wu |
| 2003/0029914 A1 | 2/2003 | Hortman et al. |
| 2003/0030270 A1 | 2/2003 | Franko et al. |
| 2003/0037008 A1 | 2/2003 | Raju et al. |

(56) References Cited

U.S. PATENT DOCUMENTS

| | | |
|---|---|---|
| 2003/0059635 A1 | 3/2003 | Naasani |
| 2003/0078893 A1 | 4/2003 | Shah et al. |
| 2003/0080182 A1 | 5/2003 | Gunther |
| 2003/0088426 A1* | 5/2003 | Benson ............ G07B 17/00508 705/332 |
| 2003/0101143 A1 | 5/2003 | Montgomery et al. |
| 2003/0101147 A1 | 5/2003 | Montgomery et al. |
| 2003/0101148 A1 | 5/2003 | Montgomery et al. |
| 2003/0115162 A1 | 6/2003 | Konick |
| 2003/0138345 A1 | 7/2003 | Schwabe |
| 2003/0140017 A1 | 7/2003 | Patton et al. |
| 2003/0144972 A1 | 7/2003 | Cordery et al. |
| 2003/0167241 A1 | 9/2003 | Gilham |
| 2003/0182155 A1 | 9/2003 | Nitzan et al. |
| 2003/0187666 A1 | 10/2003 | Leon |
| 2003/0204477 A1 | 10/2003 | McNett |
| 2003/0233276 A1 | 12/2003 | Pearlman et al. |
| 2003/0236709 A1 | 12/2003 | Hendra et al. |
| 2004/0000787 A1 | 1/2004 | Vig et al. |
| 2004/0002926 A1 | 1/2004 | Coffy et al. |
| 2004/0048503 A1 | 3/2004 | Mills et al. |
| 2004/0064422 A1 | 4/2004 | Leon |
| 2004/0070194 A1 | 4/2004 | Janetzke et al. |
| 2004/0083179 A1 | 4/2004 | Sesek et al. |
| 2004/0089482 A1 | 5/2004 | Ramsden et al. |
| 2004/0112950 A1 | 6/2004 | Manduley et al. |
| 2004/0122776 A1 | 6/2004 | Sansone |
| 2004/0122779 A1 | 6/2004 | Stickler et al. |
| 2004/0125413 A1 | 7/2004 | Cordery |
| 2004/0128264 A1* | 7/2004 | Leung ................ G07B 17/0008 705/402 |
| 2004/0174012 A1 | 9/2004 | Hagen |
| 2004/0185827 A1 | 9/2004 | Parks |
| 2004/0185882 A1 | 9/2004 | Gecht et al. |
| 2004/0186811 A1 | 9/2004 | Gullo et al. |
| 2004/0200902 A1 | 10/2004 | Ishioroshi |
| 2004/0215523 A1 | 10/2004 | Wulff et al. |
| 2004/0215581 A1 | 10/2004 | Lord et al. |
| 2004/0215583 A1 | 10/2004 | Elliott |
| 2004/0220935 A1 | 11/2004 | McGraw et al. |
| 2004/0236938 A1 | 11/2004 | Callaghan |
| 2004/0241424 A1 | 12/2004 | Barbera-Guillem |
| 2004/0254898 A1 | 12/2004 | Parker et al. |
| 2005/0033653 A1 | 2/2005 | Eisenberg et al. |
| 2005/0065892 A1 | 3/2005 | Ryan et al. |
| 2005/0065896 A1 | 3/2005 | Kummer et al. |
| 2005/0065897 A1 | 3/2005 | Ryan et al. |
| 2005/0071296 A1 | 3/2005 | Lepkofker |
| 2005/0071297 A1 | 3/2005 | Kara |
| 2005/0080751 A1 | 4/2005 | Burningham |
| 2005/0082818 A1 | 4/2005 | Mertens |
| 2005/0087605 A1 | 4/2005 | Auslander et al. |
| 2005/0114276 A1 | 5/2005 | Hunter et al. |
| 2005/0116047 A1 | 6/2005 | Lu et al. |
| 2005/0119786 A1 | 6/2005 | Kadaba |
| 2005/0137949 A1 | 6/2005 | Rittman et al. |
| 2005/0171869 A1 | 8/2005 | Minnocci |
| 2005/0192899 A1 | 9/2005 | Reardon |
| 2005/0192911 A1 | 9/2005 | Mattern |
| 2005/0195214 A1 | 9/2005 | Reid et al. |
| 2005/0209913 A1 | 9/2005 | Wied et al. |
| 2005/0237203 A1 | 10/2005 | Burman et al. |
| 2005/0256811 A1 | 11/2005 | Pagel et al. |
| 2005/0278263 A1* | 12/2005 | Hollander ........ G07B 17/00435 705/402 |
| 2005/0278266 A1 | 12/2005 | Ogg et al. |
| 2006/0000648 A1 | 1/2006 | Galtier |
| 2006/0020505 A1 | 1/2006 | Whitehouse |
| 2006/0100970 A1* | 5/2006 | Morony ................ G06Q 10/08 705/37 |
| 2006/0116971 A1 | 6/2006 | Beckstrom et al. |
| 2006/0118631 A1 | 6/2006 | Lubow et al. |
| 2006/0122947 A1 | 6/2006 | Poulin |
| 2006/0136347 A1 | 6/2006 | Reichelsheimer et al. |
| 2006/0173796 A1 | 8/2006 | Kara |
| 2006/0190418 A1 | 8/2006 | Huberty et al. |
| 2006/0220298 A1 | 10/2006 | Fairweather et al. |
| 2006/0238334 A1 | 10/2006 | Mangan et al. |
| 2006/0259390 A1 | 11/2006 | Rosenberger |
| 2006/0283943 A1 | 12/2006 | Ostrowski et al. |
| 2006/0287096 A1 | 12/2006 | O'Kelley, II et al. |
| 2006/0293907 A1 | 12/2006 | Castineiras |
| 2007/0005518 A1 | 1/2007 | Beckstrom et al. |
| 2007/0011995 A1 | 1/2007 | Weaver et al. |
| 2007/0017985 A1 | 1/2007 | Lapstun et al. |
| 2007/0033110 A1 | 2/2007 | Philipp et al. |
| 2007/0073587 A1 | 3/2007 | Walker et al. |
| 2007/0078795 A1 | 4/2007 | Chatte |
| 2007/0080228 A1 | 4/2007 | Knowles et al. |
| 2007/0100672 A1 | 5/2007 | McBride et al. |
| 2007/0174215 A1 | 7/2007 | Morel |
| 2007/0179853 A1 | 8/2007 | Feige et al. |
| 2007/0185726 A1 | 8/2007 | Stickler et al. |
| 2007/0198441 A1 | 8/2007 | Kara |
| 2007/0253350 A1 | 11/2007 | Tung et al. |
| 2007/0255664 A1 | 11/2007 | Blumberg et al. |
| 2008/0046384 A1 | 2/2008 | Braun et al. |
| 2009/0125561 A1 | 5/2009 | Garcia |
| 2009/0164392 A1 | 6/2009 | Raju et al. |
| 2009/0171848 A1 | 7/2009 | Wronski, Jr. et al. |
| 2009/0171861 A1 | 7/2009 | Horree et al. |
| 2009/0212098 A1 | 8/2009 | Stratton et al. |
| 2010/0063888 A1 | 3/2010 | Sajkowsky |
| 2010/0298662 A1 | 11/2010 | Yu et al. |
| 2010/0312627 A1 | 12/2010 | Khechef et al. |
| 2011/0015935 A1 | 1/2011 | Montgomery et al. |
| 2011/0022544 A1 | 1/2011 | Kim et al. |
| 2011/0029429 A1 | 2/2011 | Whitehouse |
| 2011/0071944 A1 | 3/2011 | Heiden et al. |
| 2011/0145107 A1 | 6/2011 | Greco |
| 2011/0204132 A1 | 8/2011 | Vera |
| 2011/0225180 A1 | 9/2011 | Liao et al. |
| 2012/0008766 A1 | 1/2012 | Robertson et al. |
| 2012/0159603 A1 | 6/2012 | Queck |
| 2012/0233252 A1 | 9/2012 | Vats et al. |
| 2012/0240204 A1 | 9/2012 | Bhatnagar et al. |
| 2013/0018759 A1* | 1/2013 | Metral .................. G06Q 50/28 705/334 |
| 2013/0024393 A1* | 1/2013 | Fleur .................. G06Q 10/083 705/333 |

FOREIGN PATENT DOCUMENTS

| | | |
|---|---|---|
| EP | 153816 A2 | 9/1985 |
| EP | 0282359 A2 | 9/1988 |
| EP | 0507562 A2 | 10/1992 |
| EP | 0571259 A1 | 11/1993 |
| EP | 0596706 A1 | 5/1994 |
| EP | 0658861 A1 | 6/1995 |
| EP | 0782111 | 7/1997 |
| EP | 0900830 A1 | 3/1999 |
| EP | 0927958 A2 | 7/1999 |
| EP | 0927963 A2 | 7/1999 |
| EP | 1096429 A2 | 5/2001 |
| EP | 1525994 A2 | 4/2005 |
| EP | 2192557 A1 * | 6/2010 ........... G06Q 10/087 |
| FR | 2580844 A1 | 10/1986 |
| GB | 2246929 A | 2/1992 |
| GB | 2251210 A | 7/1992 |
| GB | 2271452 A | 4/1994 |
| JP | 63-147673 | 6/1988 |
| JP | 04-284558 B2 | 10/1992 |
| JP | 05-132049 | 5/1993 |
| JP | 09-508220 | 8/1997 |
| JP | 11-249205 | 9/1999 |
| JP | 2000-105845 A | 4/2000 |
| JP | 2005-215905 A | 8/2005 |
| WO | WO-88/01818 A1 | 3/1988 |
| WO | WO-94/27258 A1 | 11/1994 |
| WO | WO-95/17732 | 6/1995 |
| WO | WO-1995/19016 A1 | 7/1995 |
| WO | WO-97/14085 | 4/1997 |
| WO | WO-97/40472 A1 | 10/1997 |
| WO | WO-98/14907 A2 | 4/1998 |

(56) References Cited

FOREIGN PATENT DOCUMENTS

| WO | WO-98/14909 | | 4/1998 |
|---|---|---|---|
| WO | WO-98/57302 | A1 | 12/1998 |
| WO | WO-98/57460 | A1 | 12/1998 |
| WO | WO-02/063517 | A2 | 8/2002 |
| WO | WO-03/039051 | A2 | 5/2003 |
| WO | WO-03/083784 | A1 | 10/2003 |
| WO | WO-2005/042645 | A2 | 5/2005 |
| WO | WO-2005/060590 | A2 | 7/2005 |

OTHER PUBLICATIONS

U.S. Appl. No. 10/862,058, Pagel et al.
U.S. Appl. No. 12/030,739, McBride et al.
U.S. Appl. No. 13/172,066, McBride et al.
U.S. Appl. No. 13/286,854, Biswas et al.
Martorelli, Business Reply Mail, Winston M. Blount Postal History Symposium, Sep. 2011.
Ford, C., "Frequent Flyer Programs," Australian Accountant, 63,1, Feb. 1993, pp. 52-58, 7 pages.
Alexander, K.L., "U.S. Stamps Pay Tribute to Starry-Eyed Jurors," Final Edition, Calgary Herald, Calgary, Alberta, Canada, Sep. 14, 2007, 2 pages.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Mobile Postage Stamps via Text Messages Announced, Phone Reviews, Mobile Phones, News, Mar. 11, 2011, pp. 1-3.
Anonymous, "Automated Indicia Detection System From Parascript Protects Postage Revenue for Postal Operators, Cracks Down on Fraud:—Parascript StampVerify Simplifies Complex Task of Automatically Locating and Verifying Different Types of Indicia on Envelope Images-," PR Newswire, New York, Sep. 18, 2007, 2 pages.
Brown, B., "Internet Postage Services," PC Magazine, Jun. 6, 2000, p. 133, Ziff-Davis Publishing Company, 1 page.
"Zazzle® Offers Zazzle Custom Stamps™ for Business," May 17, 2006, https://www.zazzle.com/about/press/releases?pr=12624, 2 pages.
Porter, William, "Canadians Take to Vanity Stamps in Very Big Way," Denver Post, Jul. 9, 2000, 2 pages.
Derrick, J. "The Meter is Running," Office Systems, vol. 11 No. 9, Sep. 1994, 6 pages.
Computergram International, "U.S. Postal Service to Introduce PC Postage Plans Today," Aug. 9, 1999, No. 3720, 1 page.
Terrell, "Licking Stamps: A PC and a Printer Will End Trips to the Post Office," U.S. News & World Report, Sep. 28, 1998, vol. 125, No. 12, 4 pages.
"Miniature, Coin-Shaped Chip is Read or Written with a Touch," News Release, Dallas Semiconductor, Jul. 1991, 9 pages.
"Endicia Announces PictureItPostage™," Jun. 6, 2005, http://www.endicia.com/-/media/Files/About%20Us/Press%20Room/Endicia_pr05-06-06.ashx>, 2 pages.
Ralph, J. "What's Selling: From Bricks and Mortar to Bricks and Clicks," Playthings Magazine, Feb. 1, 2003, 4 pages.
Menezes, A.J. et al., "Handbook of Applied Cryptography," CRC Press LLC, 1997 (Excerpt—Cover pages and pp. 512-515), 22 pages.
"Information-Based Indicia Program (IBIP) Performance Criteria for Information-Based Indicia and Security Architecture for Closed IBI Postage Metering Systems (PCIBI-C)," Jan. 12, 1999, The United States Postal Service (USPS), 49 pages.
Stamps: Beyond Elvis, May 15, 1994, New York Times Archives, 2 pages.
Minnick, Robert, "Postage Imprinting Apparatus and Methods for Use With a Computer Printer", Apr. 27, 1995, 71 pages.
U.S. Appl. No. 10/994,698 to Leon et al., filed Nov. 22, 2004, and entitled "Image Customization of Computer-Based Value-Bearing Items," 126 pages.
U.S. Appl. No. 10/994,728 to Huebner et al., filed Nov. 22, 2004, and entitled "Printing of Computer-Based Value-Bearing Items," 122 pages.
U.S. Appl. No. 10/994,914 to McBride et al., filed Nov. 22, 2004, and entitled "Customized Computer-Based Value-Bearing Item Quality Assurance," 131 pages.
U.S. Appl. No. 11/114,964 to Clem et al., filed Apr. 25, 2005, and entitled "Quality Assurance of Image-Customization of Computer-Based Value-Bearing Items," 122 pages.
U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 69 pages.
U.S. Appl. No. 11/644,458 to Leon, filed Dec. 20, 2006, and entitled "Systems and Methods for Creating and Providing Shape-Customized, Computer-Based, Value-Bearing Items," 77 pages.
U.S. Appl. No. 11/729,239 to Leon et al., filed Mar. 28, 2007 and entitled "Computer-Based Value-Bearing Item Customization Security," 131 pages.
U.S. Appl. No. 12/316,240 to Leon, filed Dec. 9, 2008, and entitled "Systems and Methods for Facilitating Replacement of Computer-Based Value-Bearing Items," 158 pages.
U.S. Appl. No. 12/500,970 to Clem, filed Jul. 10, 2009, and entitled "Automatic Guarantee Delivery Tracking and Reporting for United States Postal Service Postage Refunds for Paid Computer-Based Postage," 70 pages.
U.S. Appl. No. 12/943,519 to Clem, filed Nov. 10, 2010, and entitled "Rolls of Image-Customized Value-Bearing Items and Systems and Methods for Providing Rolls of Image-Customized Value-Bearing Items," 65 pages.
U.S. Appl. No. 13/038,029 to Leon etal, filed Mar. 1, 2011 and entitled "Image-Customization of Computer-Based Value-Bearing Items," 131 pages.
U.S. Appl. No. 13/081,356 to Leon et al., filed Apr. 6, 2011 and entitled "Computer-Based Value-Bearing Item Customization Security," 136 pages.
Unpublished U.S. Appl. No. 11/509,309 to Leon filed Aug. 24, 2006 and entitled "Invisible Fluorescent Ink Mark," 15 pages.
Unpublished U.S. Appl. No. 12/030,739 to McBride et al. filed Feb. 13, 2008 and entitled "Systems and Methods for Distributed Activation of Postage," 35 pages.
International Search Report attached to PCT Application WO/88/01818, dated Nov. 30, 1987, 2 pages.
International Search Report issued for Application PCT/US96/16366, dated Jun. 13, 1997, 9 pages.
Unpublished U.S. Appl. No. 11/323,463 to Leon et al., filed Dec. 30, 2005 and entitled "Systems and Methods for Single Pass Printing Postage Indicia," 23 pages.
Davies, Brad L. "Printing System for Preventing Injustice by Delivering Print Data from Postal Charge Meter to Printer," Jan. 2001, 1 page.
Unpublished U.S. Appl. No. 13/172,066 to McBride et al., filed Jun. 29, 2011 and entitled "Systems and Methods Using Mobile Communication Handsets for Providing Postage," 50 pages.
Unpublished U.S. Appl. No. 13/286,854 to Crouse et al., filed Nov. 1, 2011 and entitled "Perpetual Value Bearing Shipping Labels," 49 pages.
Feare, Tom, "Shipping System Saves $2 Million Yearly," Modern Materials Handling, Aug. 2000, 55, 9; pp. A6-A7.
"Domestic Mail Manual Section 604," United States Postal Service, Aug. 31, 2005, 45 pages.
"Hi-tech stamps that link to app.," (Sep. 3, 2010), The Herald, https://dialog.proquest.com/professional/docview/749282854?accountid=161862 (Year: 2010).
Bleumer, G. Electronic Postage Systems, Springer, 2007, 263 pages.

\* cited by examiner

SYSTEMS AND METHODS PROVIDING KNOWN SHIPPER INFORMATION FOR SHIPPING INDICIA

CROSS-REFERENCE TO RELATED APPLICATIONS

The present application is a continuation of U.S. patent application Ser. No. 13/357,311 filed Jan. 24, 2012 and entitled "SYSTEMS AND METHODS PROVIDING KNOWN SHIPPER INFORMATION FOR SHIPPING INDICIA," which is related to commonly assigned U.S. patent application Ser. No. 12/030,739 filed Feb. 13, 2008 and entitled "SYSTEMS AND METHODS FOR DISTRIBUTED ACTIVATION OF POSTAGE," issued Aug. 6, 2019 as U.S. Pat. No. 10,373,398, U.S. patent application Ser. No. 13/172,066 filed Jun. 29, 2011 and entitled "SYSTEMS AND METHODS USING MOBILE COMMUNICATION HANDSETS FOR PROVIDING POSTAGE," abandoned, and U.S. patent application Ser. No. 13/286,854 filed Nov. 1, 2011 and entitled "PERPETUAL VALUE BEARING SHIPPING LABELS," issued Nov. 24, 2020 as U.S. Pat. No. 10,846,650, the disclosures of which are hereby incorporated herein by reference in their entirety.

TECHNICAL FIELD

The present invention relates generally to shipping services and, more particularly, to providing known shipper information for shipping indicia used in providing shipping services.

BACKGROUND OF THE INVENTION

The shipment of various items, such as letters and parcels, by both businesses and individuals is commonplace today, facilitating commerce and communication. Accordingly, a number of shipping service providers, such as the United States Postal Service (USPS), Federal Express (FEDEX), United Parcel Service (UPS), etc., exist to provide a variety of shipping services to shippers, whether businesses or individuals. Accordingly, shippers may use one or more such shipping service provider to conveniently ship a variety of items from one or more shipper location to one or more recipient location.

Often, some form of indicia of payment for shipping services will be used with respect to the items being shipped. For example, when availing themselves of the shipping services of a shipping service provider, a shipper may provide shipping indicia (e.g., in the form of a stamp, a postage meter indicia, etc.) affixed to the item being shipped to show that prepayment for the shipping service has been made. Some such shipping indicia, such postage meter indicia generated by a postage meter licensed to the shipper, may be uniquely associated with the shipper and thus provide information regarding the identity of the shipper (referred to herein as known shipper indicia). However, other such shipping indicia, such as traditional stamps which provide fungible shipping indicia, themselves provide no information regarding the identity of the shipper (referred to herein as unknown shipper indicia). Such unknown shipper indicia are often pre-produced (e.g., in advance of shipping activity in which they are to be utilized) and are provided in a form which is delivery destination and package content agnostic (and may also be shipper agnostic), and thus may be used by any shipper as needed and appropriate. Additionally such unknown shipper indicia may be produced using a shared meter (e.g., a meter provided for use by patrons of a reseller or service provider, such as Amazon.com, EBay, etc.) wherein the indicia generated fail to themselves provide known shipper information.

The foregoing shipping service providers may utilize their own fleet of vehicles (e.g., trucks, aircraft, motor scooters, etc.) and/or "for hire" vehicles (e.g., trucks of an over the road trucking service or less than a truck load service, charter aircraft, freight rail service, freight maritime service, etc.) to transport items being shipped between various points (e.g., shipper location, shipping service hub or station, recipient location, etc.). Additionally or alternatively, such shipping service providers may utilize common carrier vehicle fleets (e.g., commercial passenger aircraft, trains, busses, etc.) to transport items being shipped.

Recent events, such as political unrest and terrorist activity, have resulted in increased risk to public safety and security in many previously and otherwise safe situations. For example, although the carrying of large numbers of passengers by common carrier and/or routing common carrier vehicles through, under, or over heavily populated areas typically presents an acceptable risk to the safety of both passengers and bystanders, the introduction of certain items (e.g., explosives, radioactive matter, bio-hazardous materials, etc.) to such common carrier vehicles, particularly if equipped with timed or proximity control circuitry, could introduce an unacceptable risk to safety. Information regarding the identity of the shipper may mitigate such risks. For example, merely collecting information regarding the identity of a shipper may discourage shipment of improper items. Moreover, knowing the identity of shippers allows screening of items to avoid shipping items from suspected or known miscreants and/or facilitates investigation of incidents resulting from shipment of items.

Such shipper information may be useful beyond mitigating risk to public safety and security. For example, fraud with respect to payment for shipping services is always a risk for shipping service providers. The aforementioned shipper information may be utilized in discouraging and/or investigating instances of fraud.

Accordingly, at least one shipping service provider has introduced a known shipper requirement with respect to the shipping of some items. In particular, the USPS implements a "known mailer" requirement with respect to some packages shipped (e.g., packages larger than a flat or envelope), and thus requires information about the shipper to be collected and included in the shipping indicia used in association with the shipping of such items. For example, for a shipper having an ongoing relationship with the shipping service provider or its agent (e.g., a shipper having an existing shipper account, and thus information identifying the shipper has previously been collected) the USPS allows the use of shipping indicia generated using the shipper's account (e.g., meter identification information) to provide identification of the shipper. However, for a casual shipper (e.g., an individual shipper providing cash payment for shipping services to an agent of the shipping service provider) the USPS requires that the identification of the shipper and/or other information be collected by the agent prior to accepting the item for shipping. Accordingly, the availability of shipping services with respect to some items (e.g., items larger than a flat or an envelope) may be limited and/or inconvenient with respect to certain shippers (e.g., a casual shipper using fungible shipping indicia). Moreover, in addition to the collection of shipper information being inconvenient to both the shipper and shipping service provider agent, the information collected is prone to inaccuracies (e.g., mistakes in the information as provided by the shipper and/or as understood by the agent, false information provided by the shipper, etc.). Accordingly, the present known shipper requirements present an often unsatisfactory solution to the risk mitigation sought.

BRIEF SUMMARY OF THE INVENTION

The present invention is directed to systems and methods which provide known shipper information in association with unknown shipper indicia. Embodiments of the invention operate to collect information regarding a shipper and associate the shipper information with unknown shipper indicia. For example, at a time of purchase of unknown shipper indicia shipping information is collected and associated with the purchased unknown shipper indicia. Thus, when the unknown shipper indicia is used the shipper information may be used to meet a known shipper requirement implemented by a shipping service provider.

Shipper information may be collected actively (i.e., solicited from the shipper) and/or passively (i.e., derived or collected from transaction information) according to embodiments of the invention. For example, when purchasing unknown shipper indicia a shipper may be solicited to present identification information, such as in the form of verified identification credentials and/or other user provided identification (e.g., identification card, debit/credit account card, biometric sample, address, telephone number, electronic/email address, etc.). Additionally or alternatively, identification information may be obtained using transaction information (e.g., payment information, purchased product delivery address information, computer "fingerprint" information, etc.) from the purchase of the unknown shipper indicia. Some or all such shipper information is stored in association with the purchased unknown shipper indicia, such as in a database available to the shipping service provider associating the shipper information with information unique to the purchased unknown shipper indicia, according to embodiments of the invention.

Embodiments of the invention implement a multi-level shipper information collecting technique. For example, embodiments may operate to determine if shipper information satisfactory to a known shipper requirement has been collected, whether actively or passively, and if so such information may be associated with particular unknown shipper indicia such that items bearing those unknown shipper indicia are acceptable for a first group of shipping services (e.g., shipping services using any of common carriers and/or private carriers for transportation of shipped items). Such embodiments, where shipper information satisfactory to a known shipper requirement has not been collected, may further operate to actively solicit shipper information and/or passively gather shipper information for performing a transaction matrix analysis to determine a shipper identification risk level. Such transaction matrix analysis may operate to analyze multiple pieces of shipper information (e.g., collected from different sources) to provide a determination as to a level of risk that the shipper information correctly and/or uniquely identifies the shipper. This shipper information and/or the shipper identification risk level are preferably associated with particular unknown shipper indicia. Depending upon the shipper identification risk level, items bearing the unknown shipper indicia may be acceptable for a first group of shipping services (e.g., shipping services using any of common carriers and/or private carriers for transportation of shipped items) or restricted to a second group of shipping services (e.g., shipping services which do not use common carriers for transportation of shipped items). Although first and second groups of shipping services are mentioned in the foregoing example, it should be appreciated that shipper information of embodiments of the invention may be utilized with respect to parsing items to be shipped between any number of shipping services.

Transaction matrix analysis performed according to embodiments of the invention is not limited to the use of information available at a time of purchase of the unknown shipper indicia. For example, embodiments of the invention may perform a transaction matrix analysis (or operate to supplement a previously transaction matrix analysis) at a time of shipping the item and/or during processing of a shipped item. In operation, according to embodiments of the invention, the shipping service provider may analyze information available on or with a shipped item (e.g., return address provided on a shipping label, carrier item pickup location, first shipper terminal drop off location, etc.) in a transaction matrix analysis to determine if the information is consistent with other shipper information associated with the shipping indicia borne by the item. Such analysis, where not the initial transaction matrix analysis, may operate to alter a previously determined shipper identification risk level determination or, where it is the initial transaction matrix analysis, may operate to initially establish a shipper identification risk level determination.

A shipping service provider, when accepting an item for shipment and/or when processing the item during shipment, may use the unknown shipper indicia to access shipper information associated therewith in accordance with embodiments of the invention to provide an appropriate level of shipping services. Accordingly, known shipper type restrictions may be implemented with various forms of unknown shipper indicia, even with fungible shipping indicia purchased by casual shippers. Moreover, the shipper information collection techniques of embodiments is not only less inconvenient to both the shipper and shipping service provider agent, the information collected is less prone to inaccuracies as a result of the transaction matrix analysis provided.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
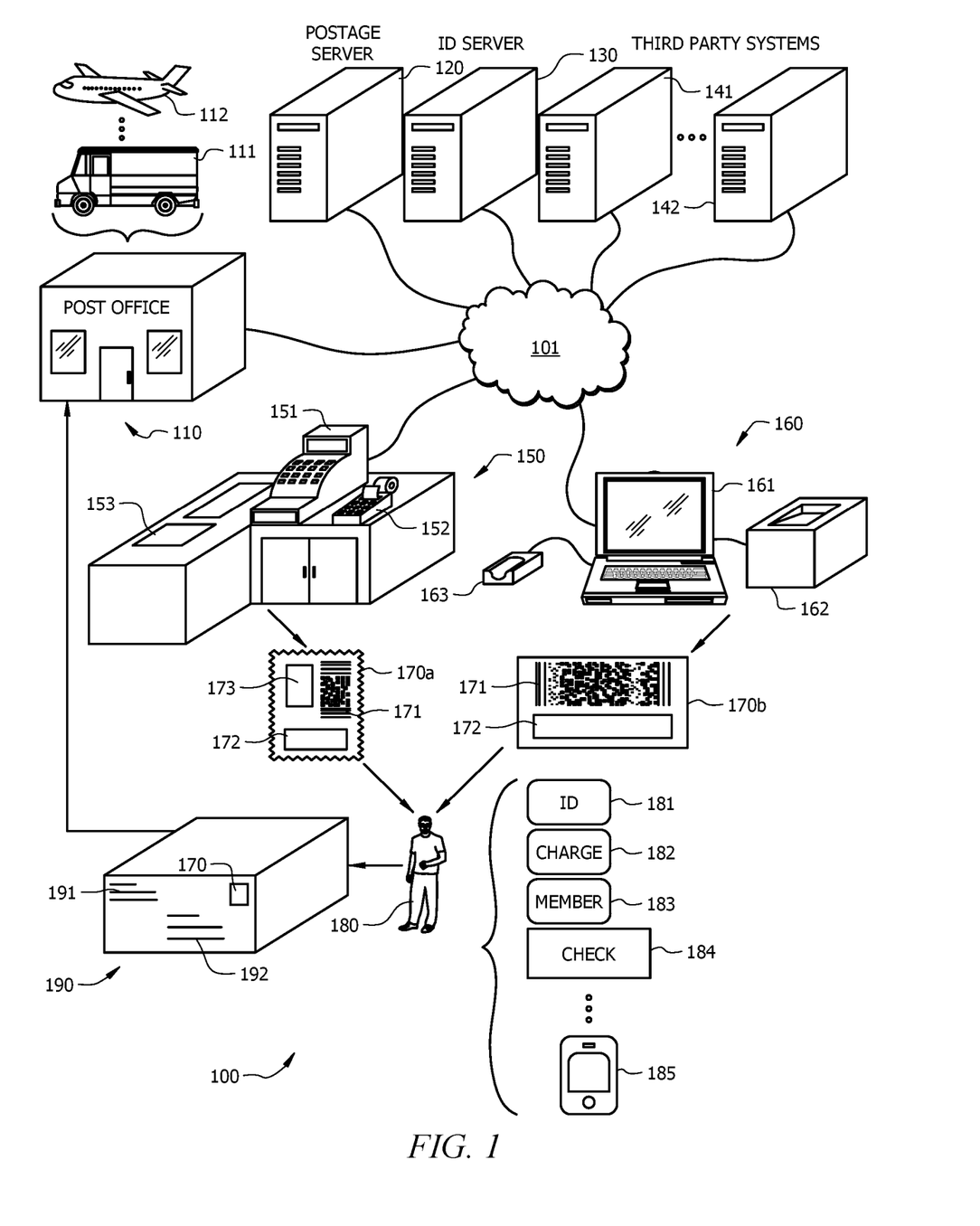
FIG. 1 shows a high level block diagram of a system adapted to provide known shipper type information for unknown shipper indicia according to embodiments of the invention.

FIG. 1 shows a high level block diagram of a system adapted to provide known shipper type information for unknown shipper indicia according to embodiments of the invention. Specifically, system 100 is adapted to gather shipper information, whether actively or passively collected, and to associate that shipper information with one or more unknown shipper indicia, such as shipping indicium 170. Such shipper information may be stored in one or more database, such as a database of postage server 120, in association with information identifying one or more unknown shipper indicia for use by a shipping service provider (represented by shipping service provider 110) in providing shipping services. For example, the shipping service provider may scan shipping indicium 170, such as may be borne upon item 190 to be shipped using shipping services of the shipping service provider, to access shipper information for a determination regarding particular shipping services (e.g., shipping services using freight carrier truck 111, commercial passenger aircraft 112, etc.) to be made available in shipping the item.

Unknown shipper indicia as may be provided known shipper information according to embodiments of the invention may be provided in many forms. For example, unknown shipper indicia used according to embodiments of the invention comprises a postage stamp type configuration, such as shown by the embodiment of unknown shipper indicium 170a, or a meter indicia, such as shown by the embodiment of unknown shipper indicium 170b, etc. It should be appreciated that although the embodiment of unknown shipper indicium 170a is shown in association with point of sale system 150 (discussed below) and the embodiment of unknown shipper indicium 170b is shown in association with computer system 160 (also discussed below) in the illustrated embodiment, this association is merely exemplary. Either or both such embodiments of unknown shipper indicia may be utilized in association with any of these systems. Moreover, the unknown shipper indicia as may be utilized according to embodiments of the invention are not limited to the particular exemplary embodiments illustrated. Such unknown shipper indicia may comprise various functional and/or ornamental features. For example, unknown shipper indicia provided according to embodiments of the invention may be provided as independent shipping indicia for affixing to items (e.g., letters, parcels, etc.), may comprise more robust shipping products, such as shipping labels as shown and described in the above referenced patent application entitled "Perpetual Value Bearing Shipping Labels," etc.

A functional feature of unknown shipper indicia utilized according to embodiments of the invention comprises substantially unique indicia identifying information (i.e., information which is not repeated in typical use and thus may be relied upon as unique information) for identifying the unknown shipper indicium or a plurality of unknown shipper indicia (e.g., all unknown shipper indicia of a retail sales unit comprising a plurality of unknown shipper indicia). For example, a serial number or other substantially unique identifier may be provided as indicia identifying information to identify a single unknown shipper indicium or a set of unknown shipper indicia purchased by a shipper. Such indicia identifying information may be provided in machine readable form (e.g., bar code such as PDF 417, data matrix, intelligent mail bar code, postnet, etc.), such as within machine readable portion 171, and/or human readable form (e.g., alphanumeric characters, symbols, shapes, etc.), such as within human readable portion 172. Other functional features of unknown shipper indicia utilized according to embodiments of the invention may comprise a facing identification mark (FIM), indicium value information, shipping service class information, etc.

An ornamental feature of unknown shipper indicia utilized according to embodiments of the invention comprise decorative graphic or image information, such as may provide an image of a historic statesman, an image of an event or celebration, a decorative graphic, an advertisement message or logo, etc. Such ornamental information may be provided within ornamental portion 173, for example. Other functional features of unknown shipper indicia utilized according to embodiments of the invention may comprise coloration to match packaging material of items to be shipped, sizing and/or shaping of the substrate used to form the shipping indicium, etc.

A shipper, such as shipper 180, may obtain unknown shipping indicia, such as unknown shipper indicium 170, in a number of ways. For example, embodiments of the invention may provide for a shipper obtaining unknown shipper indicia through retail purchase, online purchase and fulfillment, and/or on-demand generation and printing.

In accordance with embodiments herein, shipper 180 may enter a retail establishment and select one or more pre-produced unknown shipper indicia for purchase. The selected unknown shipper indicia may be processed by point of sale system 150 to perform a purchase transaction. For example, scanner 153 may be utilized to scan the selected unknown shipper indicia (e.g., to obtain indicia identifying information thereon) and/or a keyboard or other input device of point of sale terminal 151 may be used to input information regarding the selected unknown shipper indicia. Likewise, scanner 153 may be utilized to scan user provided identification information (e.g., to obtain a biometric sample, such as fingerprint, iris print, or voice print, to obtain information from a card or other source, such as credit or debit card, identification card, membership card, etc.) and/or a keyboard or other input device of point of sale terminal 151 may be used to input user provided identification information. Point of sale system 150 may communicate with one or more of shipping service provider 110, postage server system 120, identification server system 130, and third party systems 141-142 via network 101 to perform payment processing, collect shipper information, to provide transaction matrix analysis, unknown shipper indicia activation, and/or associate shipper information with unknown shipper indicia. Techniques for activation of pre-printed indicia as shown and described in the above referenced United States patent applications entitled "Systems and Methods for Distributed Activation of Postage" and "Systems and Methods Using Mobile Communication Handsets for Providing Postage" may be utilized according to embodiments of the invention.

Although the foregoing exemplary embodiment for obtaining unknown shipper indicia through a retail transaction is described with reference to pre-produced unknown shipper indicia, embodiments herein may provide such unknown shipper indicia for retail purchase which are not pre-produced. For example, unknown shipper indicia may be generated on demand at point of sale system 150, such as through cooperation of point of sale terminal 151 and postage server 120 to generate on-demand unknown shipper indicia for printing by printer 152. Techniques for the generation and activation of postage indicia as shown and described in the aforementioned United States patent applications entitled "Systems and Methods for Distributed Activation of Postage" and "Systems and Methods Using Mobile Communication Handsets for Providing Postage" may be utilized in obtaining such indicia via retail transaction according to embodiments of the invention.

Moreover, in accordance with embodiments herein, shipper 180 may access an ecommerce site, such as may be provided by shipping service provider 110, postage server system 120, and/or any of third party systems 142, using computer system 160 via network 101, and select one or more unknown shipper indicia for purchase. The selected unknown shipper indicia may be pre-produced for selection by and delivery to the shipper and/or generated on demand, such as through cooperation of postage server system 120 and computer system 160. Techniques for the generation and activation of postage indicia as shown and described in the aforementioned United States patent applications entitled "Systems and Methods for Distributed Activation of Postage" and "Systems and Methods Using Mobile Communication Handsets for Providing Postage" may be utilized in obtaining such indicia via ecommerce transactions according to embodiments of the invention. Unknown shipper indicia which is generated on demand may be generated at a location remote to the user (e.g., at a site of postage server 120 or at shipping service provider 110) and made available for pickup by the shipper or delivered to the shipper. Alternatively, unknown shipper indicia which is generated may be printed locally to the shipper, such as using printer 162 coupled to computer 161.

As with the unknown shipper indicia obtained through a more traditional retail transaction, unknown shipper indicia obtained through the aforementioned ecommerce transaction may be processed (e.g., by computer system 161 and/or postage server system 120) to perform a purchase transaction. For example, information available to or stored by postage server system 120 may be utilized to identify the selected unknown shipper indicia (e.g., to obtain indicia identifying information thereon). Moreover, scanner 163 may be utilized to scan user provided identification information (e.g., to obtain a biometric sample, such as fingerprint or iris print, to obtain information from a card or other source, such as credit or debit card, identification card, membership card, etc.) and/or a keyboard or other input device of computer 161 may be used to input user provided identification information. Computer system 160 and/or postage server system 120 may communicate with one or more of shipping service provider 110, postage server system 120, identification server system 130, and third party systems 141-142 via network 101 to perform payment processing, collect shipper information, to provide transaction matrix analysis, unknown shipper indicia activation, and/or associate shipper information with unknown shipper indicia.

From the foregoing it can be appreciated that postage server system 120, identification server system 130, third party systems 141-142, point of sale terminal 151, and computer 161 of embodiments comprise processor-based systems operating under control of one or more instruction set (e.g., software, firmware, applet, etc.) to provide operation as described herein. Such processor-based systems may comprise a central processing unit (CPU) (e.g., a processor from the PENTIUM or CORE line of processors available from Intel Corporation), memory (e.g., random access memory (RAM), read only memory (ROM), flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.). Peripheral devices, such as one or more printer, scanner (e.g., optical scanner, barcode scanner, and/or biometric sample scanner), etc. may be included for use with any or all of the foregoing processor-based systems according to embodiments herein.

Network 101 providing communication between one or more of shipping service provider 110, postage server system 120, identification server system 130, third party systems 141-142, point of sale terminal 151, and computer 161 of embodiments may comprise various forms of network links. For example, network 101 may comprise one or more of the public switched telephone network (PSTN), the Internet, an extranet, an intranet, a local area network (LAN), a metropolitan area network (MAN), a wide area network (WAN), a cellular communication network, a wireless network, and/or the like.

Irrespective of the particular way in which a shipper may obtain unknown shipper indicia, one or more of user items may be utilized in collecting shipper information according to embodiments herein. Accordingly, user items 181-185, specifically shown as identification card 181, charge/debit card 182, membership card 183, check 184, and personal digital device 185, are shown in association with shipper 180 in the embodiment of FIG. 1. It should be appreciated, however, that the particular user items shown are merely exemplary and thus other user items may be utilized in providing or collecting shipper information according to embodiments of the invention.

Identification card 181 (such as may comprise a postal identification card, national identification card, or other verified identification credentials) may be used to provide known shipper information acceptable to a shipping service provider. In accordance with embodiments of the invention, identification card 181 provides verified identification credentials, such as may be verified with respect to the individual issued the card by traditional investigative techniques, separate source verification techniques (e.g., providing data through a separate path available to the individual whose identity is being verified, such as deposit of a particular amount to the individual's bank account or leaving a message in voice mail of the individual's telephone or in an email account of the individual, which must be reported correctly back to the verifier by the individual), etc. Identification card 181 may be utilized in combination with various devices of system 100 for reliably associating known shipper information with unknown shipper indicia. For example, scanner 153 or 163 may be used, depending upon the system used by a shipper in obtaining the unknown shipper indicia, to obtain a biometric sample of the individual presenting identification card 181. Additionally or alternatively, other information such as password, voice print, iris print, photographic image, etc. captured at the point of the transaction may be used with identification card 181 of embodiments. This captured information in combination with information from identification card 181 may be utilized, perhaps by identification server system 130, to provide reliable known shipper information in association with unknown shipper indicia for use according to embodiments herein. Accordingly, such verified identification credentials may be relied upon to provide known shipper information without collection and/or analysis of additional shipper information according to embodiments of the invention.

Additionally or alternatively, shipper information which is unverified, or perhaps not verified for use in providing known shipper information, may be utilized according to embodiments of the invention. Accordingly, information which is available from or may be obtained using charge/debit card 182 (e.g., bank issued credit or debit card having one or more user financial account and/or account holder information associated therewith), membership card 183 (e.g., wholesale club membership, rewards program membership, etc. having member information associated therewith), check 184 (e.g., negotiable instrument having one or more financial account and/or account holder information associated therewith), and personal digital device 185 (e.g., cellular phone or personal digital assistant having one or more electronic address, phone number, and/or account holder information associated therewith) may be utilized in providing shipper information according to embodiments herein. Shipper information may be obtained directly or derived from such user items. For example, information available from a user item may be utilized to access additional or related information, such as may be stored by an associated one of third party systems 141-142 (e.g., account databases, membership databases, electronic address routing tables, telephone number directory data, etc.). Pieces of such unverified shipper information (e.g., shipper information which has not been verified for use in providing known shipper information) may be utilized in combination with other pieces of shipper information, such as through transaction matrix analysis of embodiments herein, may be utilized to deterring shipper identification risk level rather than relied upon singularly to provide known shipper information.

Once obtained by a shipper, unknown shipper indicia having shipper information associated therewith according to embodiments of the invention may be used in obtaining particular levels of shipping services from a shipping service provider. For example, shipper 180 may apply unknown shipper indicium 170 to item 190, such as may comprise a parcel or other item to be transported to a recipient associated with addressee information 192. Various information may be provided to or associated with item 190, such as return address information 191 and aforementioned addressee information 192, which may be utilized according to embodiments of the invention. For example, return address information 191 may be utilized as shipper information in transaction matrix analysis, such as to compare to other shipper information obtained elsewhere, for consistency to determine shipper identification risk level. It should be appreciated that such information associated with the item being shipped need not be directly present on or with the item. For example, information such as a location at which a shipping service provider carrier picked up the item and/or the first shipping service provider terminal at which the item is received (e.g., presumably the terminal most near the shipper's point of origin) may be utilized as shipper information in transaction matrix analysis for consistency to determine shipper identification risk level according to embodiments herein.

Figure 2:
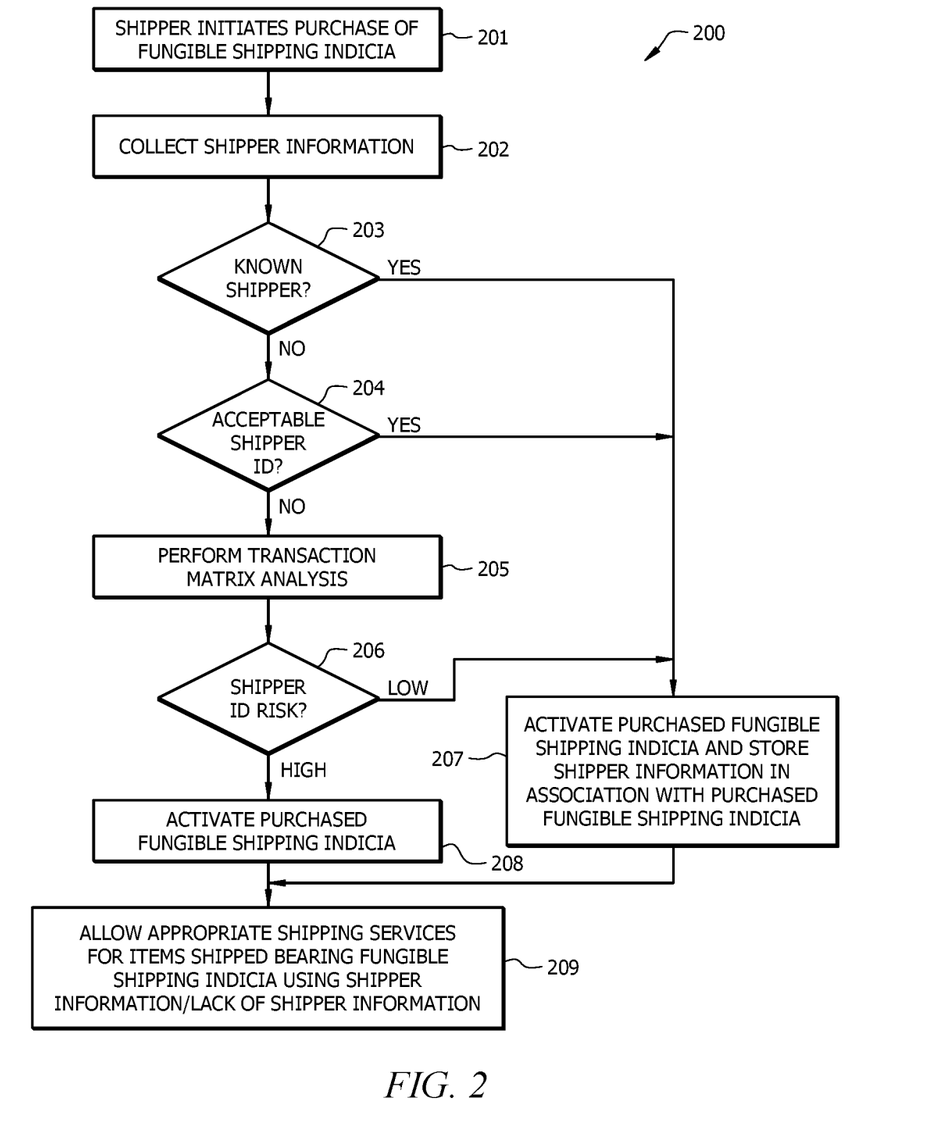
FIG. 2 shows a flow diagram of operation of the system of FIG. 1 to provide known shipper type information for unknown shipper indicia according to embodiments of the invention.

Having described system 100 adapted to provide known shipper type information for unknown shipper indicia according to embodiments of the invention, reference is now made to FIG. 2 wherein an exemplary flow diagram of operation to provide known shipper type information for unknown shipper indicia according to embodiments of the invention is shown. Flow 200 of FIG. 2 provides operation of system 100 to collect information regarding a shipper and associate the shipper information with unknown shipper indicia such that, when the unknown shipper indicia is used, the shipper information may be used to meet a known shipper requirement, for example.

At block 201 of the illustrated embodiment a shipper initiates a purchase of unknown shipper indicia for use in shipping one or more items. For example, shipper 180 may have entered a retail establishment offering unknown shipper indicia for sale to the public or may have accessed an ecommerce site offering unknown shipper indicia for sale and initiated a transaction for the purchase (and possibly generation) of a salable unit of unknown shipper indicia. The sale transaction may be conducted with respect to shipper 180 using point of sale system 150, computer system 160, and/or other appropriate equipment.

Shipper information is collected at block 202 of the illustrated embodiment. For example, shipper information may be provided by shipper 180, input by a clerk handling the transaction, collected or derived through operation of devices such as point of sale system 150, computer system 160, postage server system 120, identification server 130, third party systems 142, and/or the like. Such shipper information may be collected actively (i.e., solicited from the shipper) and/or passively (i.e., derived or collected from transaction information) according to embodiments of the invention.

In operation according to embodiments of the invention, shipper 180 may be solicited to present identification information, such as in the form of verified identification credentials. For example, shipper 180 may be solicited to provide identification card 181 if the shipper possesses such verified identification credentials. The verified identification credentials of embodiments comprise identification credentials which have been verified or validated to a level sufficient to satisfy an applicable known shipper requirement. For example, identification card 181 may comprise a national identification card or postal identification card providing reliably validated proof of identity. Shipper information as used herein may be collected directly from identification card 181 for use herein. Additionally or alternatively, information from identification card 181 may be utilized to access an identification database or other data store, such as may be hosted by identification server 130, for collecting shipper information as used herein.

Other shipper information (e.g., identification credentials, debit/credit account card, biometric sample, address, telephone number, electronic/email address, etc.), which perhaps does not itself rise to the level of known shipper information, may additionally or alternatively be collected, whether provided by the shipper or derived from other information of the transaction. For example, the user may be requested to provide information such as their name, address, biometric sample (e.g., a fingerprint or iris scan collected by one of scanners 153 or 163, a voice print collected by a microphone of point of sale terminal 151 or computer 161, etc.), and/or the like. Additionally or alternatively, user items, such as charge/debit card 182, membership card 183, check 184, and/or personal digital device 185, which may be provided by the user in the transaction or otherwise available or present during the transaction, may be utilized as a source of and/or for collecting shipper information. Accordingly, shipper information as used herein may be obtained using transaction information (e.g., payment information, purchased product delivery address information, computer "fingerprint" information, etc.) from the unknown shipper indicia purchase transaction.

In accordance with embodiments herein, information from charge/debit card 182, such as may comprise a bank issued credit or debit card having account holder information associated therewith, may directly provide identification information useful as shipper information herein. Additionally or alternatively, information from charge/debit card 182 may be utilized to access an account database or other data store, such as may be hosted by one or more of third party systems 141-142, for collecting shipper information as used herein. Likewise, membership card 183, such as may comprise a store membership program card having member information associated therewith, may be utilized to access the membership database or other data store, such as may be hosted by one or more of third party systems 141-142, for collecting shipper information as used herein. Information from check 184, such as may comprise a negotiable instrument having account holder information associated therewith, may directly provide identification information useful as shipper information herein. Additionally or alternatively, information from check 184 may be utilized to access an account database or other data store, such as may be hosted by one or more of third party systems 141-142, for collecting shipper information as used herein. Information associated with and/or available from digital device 185, such as may comprise a cellular phone or personal digital assistant having an electronic address (e.g., email address, IP address, media access control (MAC) address, etc.), phone number, and/or account holder information associated therewith, may be collected directly from the shipper and/or digital device 185 (e.g., using a wireless or optical link to digital device 185). Such digital device information may be used according to embodiments of the invention to access an account database or other data store, such as may be hosted by one or more of third party systems 141-142, for collecting shipper information used herein.

Having collected shipper information at block 202, the illustrated embodiment proceeds to block 203 wherein a determination is made as to whether the shipper is a known shipper. That is, the shipper information may identify the shipper as a known shipper acceptable to receive shipping services available to known shippers. For example, where the shipper has a verified postage metering account through a service provider associated with postage server 120, the shipper may be identified as a known shipper with respect to unknown shipper indicia using that postage metering account (and without actually using the postage metering account to generate postage indicia or other shipping indicia). The shipper may be identified as a known shipper through the use of meter account information collected as shipping information at block 202, for example. Where the shipper is purchasing unknown shipper indicia through use of computer system 160, fingerprint information for computer 161 (e.g., the fingerprint can be one or more of the identity of the software being used, the identity of the hardware, such as CPU, hard drive, etc., and/or like information which in the aggregate provides a somewhat unique identity of the computer system) may be used alone or in combination with other information (e.g., the aforementioned postage meter account information) to identify the shipper and/or verify the shipper's identity for use as known shipper information.

If at block 203 the shipper is determined to be a known shipper, processing according to the illustrated embodiment proceeds to block 207 wherein the purchased unknown shipper indicia is activated and shipper information which preferably meets known shipper information requirements of a shipping service provider to provide shipping services using the purchased unknown shipper indicia is stored in association with the purchased unknown shipper indicia. If, however, the shipper is not determined to be a known shipper at block 203, processing according to the illustrated embodiment proceeds to block 204.

At block 204, a determination is made as to whether information sufficient to use as known shipper information has been provided. For example, a postal identification card, national identification card, or other verified identification credentials (e.g., in the form of identification card 181) provided by the shipper may be utilized to provide known shipper information acceptable to a shipping service provider.

If at block 204 information sufficient to use as known shipper information is determined to have been collected, processing according to the illustrated embodiment proceeds to block 207 wherein the purchased unknown shipper indicia is activated and shipper information which preferably meets known shipper information requirements of a shipping service provider to provide shipping services using the purchased unknown shipper indicia is stored in association with the purchased unknown shipper indicia. If, however, information sufficient to use as known shipper information is determined not to have been collected at block 204, processing according to the illustrated embodiment proceeds to block 205.

At block 205 of the illustrated embodiment, a transaction matrix analysis is performed to determine a shipper identification risk level regarding known shipper information. That is, because it has been determined that the shipper information does not indicate a known shipper (block 203) and is not sufficient itself to use as known shipper information, analysis with respect to the information available from or in association with the transaction for the purchase of unknown shipper indicia is performed to determine a confidence level regarding the shipper information accurately identifying the shipper. The transaction matrix analysis preferably operates to analyze multiple pieces of shipper information (e.g., collected from different sources) to provide a determination as to a level of risk that the shipper information correctly and/or substantially uniquely identifies the shipper. Accordingly, various individual pieces of shipper information, although individually not rising to the level of known shipper information (e.g., unverified, insufficiently unique to an individual shipper, etc.) may be analyzed using transaction matrix analysis techniques to determine the suitability of the shipper information in the aggregate to be utilized as known shipper information.

In operation according to embodiments, shipper identification and/or other information regarding the shipper (e.g., address information, account information etc.) as collected through separate sources of the shipper information may be cross compared to provide identity verification processing or otherwise determine consistency of the shipper information (e.g., the more consistent the information the lower the shipper identification risk level). Additionally or alternatively, various pieces of shipper information may be combined to provide information substantially uniquely identifying the shipper wherein transaction matrix analysis processing according to embodiments of the invention may assign shipper identification risk levels as a function of the amount and/or type of information used in the combination (e.g., the less information in the combination the higher the shipper identification risk level, the poorer the shipper identification quality of the information in the combination the higher the shipper identification risk level, etc.).

Embodiments may utilize user items for more than directly or indirectly collecting shipper information. For example, embodiments herein may utilize a user item, such as personal digital device 185, for the aforementioned identity verification processing. As an example of such identity verification processing, a shipper may provide (whether directly or in directly) some form of information associated with the shipper which is not verified, such as a name or telephone number. This information may be utilized, directly or indirectly, in an identity verification process in which digital device 185 is determined to be associated with the shipper (e.g., directly, where the aforementioned telephone number is associated with digital device 185, or indirectly, where the aforementioned name is used to look up the telephone number or other address of the digital device). For example, identity verification processing implemented according to embodiments of the invention may operate to obtain global positioning system (GPS) data from digital device 185 to confirm that the digital device which is presumably with its owner is in the same location (e.g., the retail establishment at which unknown shipper indicia are being purchased) as the shipper purporting to be the individual which is presently purchasing unknown shipper indicia.

As another example of such identify verification processing, a shipper may scan purchased unknown shipper indicia using personal digital device 185 (e.g., using a camera feature thereof according to the techniques shown and described in the above referenced patent application entitled "Systems and Methods Using Mobile Communication Handsets for Providing Postage") for purchase and/or activation of the indicia. Information (e.g., electronic address, telephone number, IP address, MAC address, etc.) identifying the personal digital device used to scan the indicia may be utilized to access subscriber account information (e.g., stored by one or more of third party systems 141-142) and obtain shipper information (e.g., name, address, etc.). This shipper information may be used with other shipper information provided directly or indirectly in the transaction to verify the shipper information. It should be appreciated that such verification techniques may be combined with other techniques, such as to use the personal digital device location information discussed above, to provide robust verification processing.

Transaction matrix analysis performed at block 205 according to embodiments of the invention is not limited to the use of information available at a time of purchase of the unknown shipper indicia. For example, embodiments of the invention may perform a transaction matrix analysis (or operate to supplement a previously transaction matrix analysis) at a time of shipping the item and/or during processing of a shipped item. In operation according to embodiments of the invention, the shipping service provider may analyze information available on or with a shipped item (e.g., return address provided on a shipping label, carrier item pickup location, first shipper terminal drop off location, etc.) in a transaction matrix analysis to determine if the information is consistent with other shipper information (e.g., stored as shipper information by postage server 120 or carried as shipper information with unknown shipper indicium 170) associated with the shipping indicia borne by the item. Such analysis, where not the initial transaction matrix analysis, may operate to alter a previously determined shipper identification risk level determination or, where it is the initial transaction matrix analysis, may operate to initially establish a shipper identification risk level determination.

It should be appreciated that embodiments of the invention implement a multi-level shipper information collecting technique. For example, embodiments may operate to collect some shipper information (block 202) and determine if known shipper information has been collected (block 203). If known shipper information has not been collected, such embodiments may operate to collect additional shipper information (processing as described with respect to block 202 provided after block 203) and determine if shipper information satisfactory to a known shipper requirement has been collected (block 204). If shipper information satisfactory to a known shipper requirement has not been collected, such embodiments may operate to collect still additional shipper information (processing as described with respect to block 202 provided after block 204, such as part of the transaction matrix analysis processing of block 205) and determine shipper identification risk levels. Such embodiments, where shipper information satisfactory to a known shipper requirement has not been collected, may further operate to actively solicit shipper information and/or passively gather shipper information for performing a transaction matrix analysis to determine a shipper identification risk level.

At block 206, a determination is made as to whether the shipper identification risk level is high or low. For example, a shipper identification risk level assigned to the aggregated shipper information by transaction matrix analysis may be compared to a threshold value establishing a level at which shipper information is to be considered acceptable as known shipper information. Such a threshold value may be established based upon the types of shipping services to be made available, the type of shipping indicia to be purchased, the type of purchase transaction used to collect shipper information, etc.

If at block 206 the shipper identification risk level is determined to be high (e.g., higher than the aforementioned threshold), processing according to the illustrated embodiment proceeds to block 208 wherein the purchased unknown shipper indicia is activated for use with respect to shipping services. For example, where the unknown shipper indicia comprises pre-produced indicia, the purchased unknown shipper indicia may be included in an activated indicia database, such as may be maintained at postage server 120, according to techniques as shown and described in the above referenced patent applications entitled "Systems and Methods for Distributed Activation of Postage" and "Systems and Methods Using Mobile Communication Handsets for Providing Postage." Where unknown shipper indicia is generated (e.g., by postage server 120, perhaps in cooperation with point of sale system 150 or computer system 160) activation of purchased unknown shipper indicia may comprise an activation process (e.g., the aforementioned inclusion in an activated database) or may be a function of the generation of the unknown shipper indicia (e.g., the generation and printing) of the unknown shipper indicia.

If, however, the shipper identification risk level is determined to be low (e.g., equal to or lower than the aforementioned threshold), processing according to the illustrated embodiment proceeds to block 207. At block 207 the purchased unknown shipper indicia is activated and shipper information which preferably meets known shipper information requirements of a shipping service provider to provide shipping services using the purchased unknown shipper indicia is stored in association with the purchased unknown shipper indicia.

Activation of the purchased unknown shipper indicia at block 207 may be accomplished in a number of ways. For example, as discussed above with respect to activation of purchased unknown shipper indicia having a high shipper identification risk level, where the unknown shipper indicia comprises pre-produced indicia, the purchased unknown shipper indicia may be included in an activated indicia database, such as may be maintained at postage server 120. Alternatively, where unknown shipper indicia is generated as part of or in response to the purchase transaction (e.g., by postage server 120, perhaps in cooperation with point of sale system 150 or computer system 160), activation of purchased unknown shipper indicia may comprise an activation process (e.g., the aforementioned inclusion in an activated database) or may be a function of the generation of the unknown shipper indicia (e.g., the generation and printing) of the unknown shipper indicia.

Storage of shipper information at block 207 of embodiments herein may comprise storage of some or all such shipper information in association with the purchased unknown shipper indicia, such as in a database available to the shipping service provider for associating the shipper information with information unique to the purchased unknown shipper indicia, according to embodiments of the invention. Thus the shipper information and/or the shipper identification risk level are preferably associated with particular unknown shipper indicia. For example, all the collected shipper information, or some portion thereof (e.g., a portion of the collected shipper information sufficient to satisfy a known shipper requirement) may be stored in a database (e.g., a database of postage server 120) in association with the unknown shipper indicia purchased. In accordance with embodiments of the invention, such shipper information is stored in association with substantially unique indicia identifying information (e.g., serial number, intelligent mail bar code information, information based indicia information, etc.) identifying the purchased unknown shipper indicia, whether each individually or a plurality of indicia purchased as part of a retail sales unit. Accordingly, as such unknown shipper indicia are processed in providing shipping services (e.g., by agents or infrastructure of shipping service provider 110), or at any other time (e.g., after the occurrence of an event whereby an investigation is made), information identifying the unknown shipper indicia may be obtained from the shipping indicia and used to access the stored shipper information.

Although the illustrated embodiment shows storing or otherwise associating shipping information and/or shipper identification risk information in association with purchased unknown shipper indicia when there is a known shipper, shipper information acceptable as known shipper information is provided, or the shipper identification risk is sufficiently low, embodiments may operate to store or otherwise associate shipper information and/or shipper identification risk information in association with purchased unknown shipper indicia in additional or alternative situations. For example, some or all such shipper information may be stored in association with the purchased unknown shipper indicia, such as in a database available to the shipping service provider for associating the shipper information with information unique to the purchased unknown shipper indicia, at block 208 according to embodiments of the invention.

In embodiments where the unknown shipper indicia are generated (e.g., at blocks 207 and 208) in response to or as a function of their purchase, some or all of the foregoing shipper information and/or shipper identification risk information may be included in association with the unknown shipper indicia itself. For example, shipper information may be printed along with the unknown shipper indicia. The inclusion of shipper information with the unknown shipper indicia may be in addition to or the alternative to the foregoing storing shipper information in association with unknown shipper indicia using indicia identifying information.

The foregoing activation and/or storage of shipper information in association with unknown shipper indicia may be utilized to provide appropriate levels of shipping services according to embodiments herein. For example, a unknown shipper indicium having shipper information stored in association therewith, or shipping information suitable for meeting a known shipper requirement, may be provided certain shipping services while a unknown shipper indicium having no shipper information stored in association therewith, or shipping information unsuitable for meeting a known shipper requirement, may be provided other (e.g., restricted) shipping services.

Accordingly, at block 209, appropriate shipping services are allowed for items bearing unknown shipper indicia using the associated shipper information or lack thereof. In particular, shipping information may be associated with particular unknown shipper indicia such that items bearing those unknown shipper indicia are acceptable for a first group of shipping services (e.g., shipping services using any of common carriers and/or private carriers for transportation of shipped items) while unknown shipper indicia having no shipper information or shipper information insufficient to meet a known shipper requirement are restricted to a second group of shipping services (e.g., shipping services which do not use common carriers for transportation of shipped items). Shipping information herein for providing the first group of shipping services may be collected as known shipper information, shipper information determined to meet a known shipper requirement, or shipper information for which shipper identification risk is determined to be sufficiently low. Accordingly, depending upon the shipper identification risk level, items bearing the unknown shipper indicia may be acceptable for a first group of shipping services (e.g., shipping services using any of common carriers and/or private carriers for transportation of shipped items) or restricted to a second group of shipping services (e.g., shipping services which do not use common carriers for transportation of shipped items).

Although first and second groups of shipping services are mentioned above, it should be appreciated that shipper information of embodiments of the invention may be utilized with respect to parsing items to be shipped between any number of shipping services. For example, only shipping information directly meeting a known shipper requirement of a shipping service provider may be designated as suitable for all shipping services, while shipping information determined to have a low shipper identification risk level may be designated as suitable for all shipping services except those of a highest security or safety level, and shipping information determined to have a high shipper identification risk level may be restricted to only shipping services of a lowest security or safety level.

Embodiments of the invention may utilize shipping information herein to provide controls with respect to the use of unknown shipper indicia in addition to or in the alternative to the aforementioned parsing between groups of shipping services available. For example, unknown shipper indicia for which no shipper information or a shipper identification risk level does not meet a known shipper requirement implemented by the shipping service provider may be rendered invalid for use with certain types of items (e.g., a unknown shipper indicium may be activated for use with respect to any shipping services, but only for particular items such as envelopes or flats). Embodiments may provide combinations of the foregoing restrictions/permissions, such as to render the unknown shipper indicia invalid if used with some items (e.g., large parcels), to define particular groups of shipping services available if used with some items (e.g., small parcels), and to define other groups of shipping services available if used with some items (e.g., envelopes and flats).

From the foregoing it can be appreciated that a shipping service provider (e.g., shipping service provider 110), when accepting an item (e.g., item 190) for shipment and/or when processing the item during shipment, may use the unknown shipper indicia (e.g., shipping indicium 170) to access shipper information associated therewith (e.g., as stored by postage server 120). The shipping service provider may use this shipping information, or lack thereof, to provide an appropriate level of shipping services. Accordingly, known shipper type restrictions may be implemented even with such unknown shipper indicia as fungible shipping indicia purchased by casual shippers to provide risk mitigation and security with respect to the use of particular forms of conveyance (e.g., commercial passenger aircraft 112) when shipping items. Moreover, shipper information collected according to embodiments of the invention may be utilized in discouraging, detecting, and/or investigating fraud with respect to the use of unknown shipper indicia (e.g., the reuse of indicia, the duplication of indicia, etc.).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, from one or more computing devices, shipper information associated with a shipper using an unknown shipper indicium, wherein the shipper information is received in connection with one or more transactions involving the shipper, wherein the unknown shipper indicium does not itself include shipper identification information of the shipper using the unknown shipper indicium for shipping services, wherein the unknown shipper indicium includes indicia identifying information configured to identify the unknown shipper indicium, and wherein the unknown shipper indicium is a value bearing postage indicium when activated;
   determining whether to activate the unknown shipper indicium as a known shipper value bearing indicium or as an unknown shipper value bearing indicium based on whether the shipper information satisfies a known shipper requirement of a carrier, wherein a first group of shipping services of the carrier are available to the shipper upon activation of the unknown shipper indicium as the unknown shipper value bearing indicium and a second group of shipping services of the carrier are available to the shipper upon activation of the unknown shipper indicium as the known shipper value bearing indicium, and wherein the second group of shipping services includes at least one service that is different from the first group of shipping services;
   activating the unknown shipper indicium; and
   providing information to a shipping service provider device configured to restrict use of the shipping services of a shipped item bearing the unknown shipper indicium based on the activation of the unknown shipper indicium as the unknown shipper value bearing indicium or as the known shipper value bearing indicium.

2. The method of claim 1, wherein determining whether to activate the unknown shipper indicium as the known shipper value bearing indicium or as the unknown shipper value bearing indicium based on the shipper information comprises performing a transaction matrix analysis of the shipper information to identify inconsistencies in the shipper information.

3. The method of claim 2, wherein performing the transaction matrix analysis of the shipper information to identify the inconsistencies in the shipper information comprises:
   generating a shipper identification risk level based on the transaction matrix analysis; and
   comparing the shipper identification risk level to a threshold value determined based, at least in part, on types of shipping services to be made available to the shipper.

4. The method of claim 3, further comprising:
   in response to determining that the shipper identification risk level exceeds the threshold value, activating the unknown shipper indicium as the unknown shipper value bearing indicium; or
   in response to determining that the threshold value exceeds the shipper identification risk level, activating the unknown shipper indicium as the known shipper value bearing indicium.

5. The method of claim 1, wherein the one or more computing devices includes a personal digital device associated with the shipper, wherein determining whether to activate the unknown shipper indicium as a known shipper value bearing indicium or as an unknown shipper value bearing indicium based on the shipper information comprises performing identity verification processing, and wherein performing identity verification processing comprises:
   identifying the personal digital device, wherein the personal digital device is used to scan the unknown shipper indicium; and
   obtaining the shipper information of the shipper from subscriber account data accessed through identifying the personal digital device.

6. A non-transitory computer readable medium storing instructions that, when executed by one or more processors, cause the one or more processors to perform operations comprising:
   receiving shipper information of a shipper using an unknown shipper indicium based on one or more transactions involving the shipper, wherein the unknown shipper indicium lacks shipper identification information of a shipper using the unknown shipper indicium for shipping services, wherein the unknown shipper indicium includes indicia identifying information configured to identify the unknown shipper indicium, and wherein the unknown shipper indicium is a value bearing postage indicium when activated;

determining whether to activate the unknown shipper indicium as a known shipper value bearing indicium or as an unknown shipper value bearing indicium based on whether the shipper information satisfies a known shipper requirement of a carrier, wherein a first group of shipping services of the carrier are available to the shipper upon activation of the unknown shipper indicium as the unknown shipper value bearing indicium and a second group of shipping services of the carrier are available to the shipper upon activation of the unknown shipper indicium as the known shipper value bearing indicium, and wherein the second group of shipping services includes at least one service that is different from the first group of shipping services;

activating the unknown shipper indicium; and providing information to a shipping service provider device configured to restrict use of the shipping services for shipment of an item bearing the unknown shipper indicium based on the activation of the unknown shipper indicium as the unknown shipper value bearing indicium or as the known shipper value bearing indicium.

7. The non-transitory computer readable medium of claim 6, wherein the operations further comprise:
generating a shipper identification risk level; and
comparing the shipper identification risk level to a threshold value.

8. The non-transitory computer readable medium of claim 6, wherein the operations further comprise:
initiating a transaction matrix analysis of the shipper information, wherein initiating the transaction matrix analysis comprises evaluating a reliability of the shipper information by searching for inconsistencies in the shipper information.

9. The non-transitory computer readable medium of claim 8, the operations further comprising dynamically adjusting a shipper identification risk level based on a quantity of the inconsistencies identified in the shipper information.

10. The non-transitory computer readable medium of claim 9, the operations further comprising:
activating the unknown shipper indicium as the unknown shipper value bearing indicium in response to a first determination that the shipper identification risk level exceeds a threshold value; or
activating the unknown shipper indicium as the known shipper value bearing indicium in response to a second determination that the threshold value exceeds the shipper identification risk level.

11. A system comprising:
an activated indicia database configured to store data records associated with activation of unknown shipper indicia, wherein an unknown shipper indicium lacks shipper identification information of a shipper using the unknown shipper indicium for shipping services, wherein the unknown shipper indicium includes indicia identifying information configured to identify the unknown shipper indicium, and wherein the unknown shipper indicium is a value bearing postage indicium when activated;

an activation server communicatively coupled to the activated indicia database and comprising one or more processors configured to:
receive shipper information of the shipper using the unknown shipper indicium, wherein the shipper information is received from one or more computing devices in connection with one or more transactions by the shipper;
determine whether to activate the unknown shipper indicium as a known shipper value bearing indicium or as an unknown shipper value bearing indicium based on whether the shipper information satisfies a known shipper requirement of a carrier, wherein a first group of shipping services of the carrier are available to the shipper upon activation of the unknown shipper indicium as the unknown shipper value bearing indicium and a second group of shipping services of the carrier are available to the shipper upon activation of the unknown shipper indicium as the known shipper value bearing indicium, and wherein the second group of shipping services includes at least one service that is different from the first group of shipping services;
activate the unknown shipper indicium; and
provide information to a shipping service provider device configured to restrict use of the shipping services for shipment of an item bearing the unknown shipper indicium based on the activation of the unknown shipper indicium as the unknown shipper value bearing indicium or as the known shipper value bearing indicium.

12. The system of claim 11, wherein the shipper information includes verified identifying data, unverified identifying data, or both, wherein the verified identifying data includes validated identifying information, and wherein the unverified identifying data includes personally identifying information highly correlated with an identity of a shipper.

13. The system of claim 12, wherein the one or more transactions include purchase of the unknown shipper indicium, and wherein the one or more computing devices include a point-of-sale (POS) terminal at which the unknown shipper indicium is purchased.

14. The system of claim 11, wherein the one or more processors configured to determine whether to activate the unknown shipper indicium as the known shipper value bearing indicium or as the unknown shipper value bearing indicium further comprise the one or more processors configured to initiate a transaction matrix analysis of the shipper information to identify patterns in the shipper information indicative of a low correlation between the shipper information and an identity of the shipper.

15. The system of claim 14, wherein the patterns in the shipper information indicative of the low correlation include inconsistencies in the shipper information.

16. The system of claim 11, wherein the one or more computing devices include a personal digital device associated with the shipper, wherein the one or more processors are further configured to initiate an identity verification process based on the shipper information, wherein the identity verification process comprises receipt of global positioning system (GPS) data from the personal digital device to confirm that the personal digital device is in a same locus as the shipper when the shipper acquires the unknown shipper indicium.

17. The system of claim 16, wherein the identity verification process further comprises:
- identification of the personal digital device based on personal digital device identifying parameters, and
- obtain the shipper information from the personal digital device identifying parameters.

18. The system of claim 11, wherein the shipper information includes personally identifying data indicative of an identity of the shipper, and wherein the personally identifying data is derived from subscriber account information.

19. The system of claim 18, wherein the one or more processors are further configured to:
- receive second shipper information in a transaction different from the one or more transactions during which the shipper information is received;
- correlate the second shipper information with the shipper information to identify inconsistencies in the second shipper information, the shipper information, or both; and
- in response to identification of the inconsistencies, adjust a shipper identification risk level determination.

20. The system of claim 19, wherein the second shipper information includes item data associated with the item, wherein the item data includes a return address of the shipper.

* * * * *